Patented July 25, 1950

2,516,659

UNITED STATES PATENT OFFICE 2,516,659

PREPARATION OF LITHIUM HALIDES

Vernon A. Stenger, Midland, Mich., assignor to The Dow Chemical Company, Midland, Mich., a corporation of Delaware No Drawing. Application June 18, 1948, Serial No. 33,919

10 Claims. (Cl. 23—89)

The invention relates to methods of preparation of lithium halides, particularly the bromide and chloride, from certain raw materials composed of essentially the double phosphate of lithium and sodium. It more particularly concerns an improved method of preparing the bromide or chloride of lithium from the crude concentrate of the double phosphate of lithium and sodium obtained in commercial operations on Searles Lake brine at Trona, California.

In the commercial production of the lithium-sodium phosphate concentrate in operations on Searles Lake brine, the "brine is pumped from wells and concentrated in triple effect evaporators, with cycled mother liquors. During evaporation, sodium chloride and burkeite (sodium carbonate-sodium sulphate double salt), with a small amount of lithium-sodium phosphate, separate from the mother liquor and are classified. The fines, mainly burkeite and entrained lithium values, are sent to the burkeite digestion process and leached free of sodium chloride. The filtered burkeite is dissolved in water, while lithium-sodium phosphate remains in suspension and is removed by froth flotation." (Quotation from Chemical and Metallurgical Engineering, page 134, vol 52, No. 10, October 1945.) It is shown in the same publication that the froth concentrate is dewatered by filtration and drying.

The lithium-sodium concentrate produced as above outlined possesses the following typical analysis:

|  | Per cent |
|---|---|
| $Li_2O$ | 20.30 |
| $P_2O_5$ | 46.40 |
| $Na_2O$ (by difference) | 22.13 |
| $K_2O$ | 0.59 |
| $CO_2$ | 2.85 |
| $SO_3$ | 0.91 |
| $CaO$ | 0.54 |
| $As_2O_3$ | 0.41 |
| $Fe_2O_3$ | 0.14 |
| $CuO$ | 0.01 |
| Acid insoluble | 0.08 |
| $H_2O$ at 130° | 3.39 |
| Volatile (at 400° C.) | 2.25 |
|  | 100.00 |

The principal object of the invention is to provide an efficient method of preparing a lithium halide such as the bromide and chloride as a crystalline product or in aqueous solution from crude lithium-sodium phosphate as a raw material. Other objects and advantages will appear as the description of the invention proceeds.

Briefly, the method of the invention comprises treating an aqueous slurry of the crude lithium-sodium phosphate with an aqueous solution of one of the trivalent metal halides: $AlCl_3$, $AlBr_3$, $FeCl_3$, $FeBr_3$, whereby the lithium-sodium phosphate is reacted therewith to produce a precipitate of the corresponding trivalent metal phosphate and a solution containing the corresponding alkali metal halides. The following equations represent the reaction, the alkali metal and the phosphate product formed depending upon the choice of precipitant as shown:

1. $Li_2NaPO_4 + AlCl_3 = 2LiCl + NaCl + AlPO_4$
2. $Li_2NaPO_4 + AlBr_3 = 2LiBr + NaBr + AlPO_4$
3. $Li_2NaPO_4 + FeCl_3 = 2LiCl + NaCl + FePO_4$
4. $Li_2NaPO_4 + FeBr_3 = 2LiBr + NaBr + FePO_4$

The precipitated phosphate is separated, as by filtration, leaving a filtrate containing the lithium and sodium halide, from which the lithium halide is recovered as such or in aqueous solution. If desired, the filtrate is further treated to remove impurities before separating the lithium halide. The invention then consists of the method hereinafter more fully described and particularly pointed out in the claims.

In carrying out the invention the crude lithium-sodium phosphate in the finely divided form in which it is produced, or which may be finely ground if necessary, is made into a slurry with water if previously dewatered. A suitable proportion of the phosphate and water is about one part by weight of the dry phosphate to 4 parts of water, although other proportions may be used. The slurry may be heated to between about 70° and 100° C., about 90° C. being preferred, and the heated slurry added to an aqueous solution of the halide of one of the trivalent metals iron or aluminum, the halide used depending upon the halide finally desired in combination with the lithium. The aqueous solution of the iron or aluminum halide is maintained preferably near the boiling point while the slurry is added, although other temperatures may be used, e. g. 70° to 90° C., and the mixture is stirred until the precipitation reaction which ensues is completed. Although it is preferable to add the slurry to the trivalent metal halide solution, if desired, the addition may be made in the reverse order. The reaction is usually completed in a few minutes at the elevated temperatures aforementioned. Various concentrations of the iron or aluminum halide solution may be used, such as up to about 30 per cent by weight or more, depending upon the solubility of the halide. I have found that the reaction proceeds more readily with the more concentrated solutions, although solutions as weak as 1 per cent may be used but are disadvantageous in that excessive amounts of water are thereby added. Of the halides of iron and aluminum I prefer to use the iron halide.

The amount of the iron or aluminum halide to use may be based upon the stoichiometrical relation between the phosphate and the halide as indicated in the foregoing equations. The use of larger amounts of the iron or aluminum halide impedes filtration, while smaller amounts reduce the yield obtainable.

The phosphatic precipitate thus formed may be filtered off while the mixture is still hot, thereby separating the precipitate from the solution which contains the lithium values as a halide corresponding to the halide of the metal used in the precipitation step and incidental impurities.

The solution from which the phosphate precipitate is separated may be concentrated so as to selectively crystallize out the alkali metal halides. In carrying out the evaporation, water is removed and the least soluble of the alkali metal halides may be crystallized out first. In the case in which the halide used for precipitation is the chloride, the order of the crystallization of the alkali metal chlorides is NaCl, KCl, LiCl, and when the halide is the bromide the order is KBr, NaBr, LiBr. The evaporation of water from the filtrate is continued until the sodium and potassium (if any) halides crystallize out and these are then separated from the mother liquor. For some purposes, e. g., air dehumidification, this mother liquor, which is a solution of the lithium halide, may be used without further treatment. If desired, the lithium halide may be recovered as a crystalline product from the mother liquor by further evaporation.

Although the filtrate from the phosphate precipitation may be worked up as described for its lithium halide content, it is preferable to further treat the filtrate to purify it and to insure a more complete precipitation before proceeding with the evaporation. This may be accomplished by adding to the filtrate about 0.002 to 0.005 of the amount of phosphate precipitant originally used and adjusting the pH of the resulting mixture to about 8 by the addition of an alkali metal hydroxide. By this operation there results a further precipitation of phosphate together with the hydroxide of either iron or aluminum, depending upon which of these metals was used as the phosphate precipitant. At this stage it is advantageous to add to the mixture a quantity of active charcoal which serves to absorb coloring matter, including the flotation agents used in the preparation of the lithium-sodium phosphate concentrate. For this purpose there may be used about 0.01 pound of active charcoal per pound of crude lithium-sodium phosphate. The mixture of precipitate, charcoal, if used, and liquor is filtered so as to remove the precipitate and charcoal, leaving a clarified filtrate. If desired, this filtrate may be worked up for its lithium content as already described; however, as heavy metal impurities are normally present, it is advantageous to remove these, as well as soluble sulphates, by treating the filtrate from the charcoal separation with an alkali metal sulphide such as sodium or potassium sulphide and a soluble barium salt such as barium chloride, thereby precipitating respectively the heavy metal impurities as the corresponding sulphides and the sulphates if any as barium sulphate. Following the foregoing precipitation, the mixture is filtered and the resulting filtrate evaporated, as before, to remove the sodium and potassium halides and recover the lithium halides.

The following examples are illustrative of the method:

*Example 1*

50 grams of dried crude lithium-sodium phosphate concentrate having an analysis corresponding to that aforementioned was made into a slurry with 300 grams of water heated to near the boiling point. (The vessel in which the slurry is made should be of ample size, as considerable foaming results if the slurry is boiled.) The hot slurry thus made was added slowly to 457 grams of a hot aqueous solution containing 105.4 grams of ferric bromide hexahydrate ($FeBr_3.6H_2O$), the solution being stirred during the addition. Some foaming occurred during the addition, due to the presence of carbonate in the crude phosphate. Reaction between the phosphate and iron bromide occurred rapidly, and the resulting suspension thickened as the ferric phosphate formed and then thinned as it subsequently underwent internal recrystallization. The reaction mixture thus obtained was kept hot, and stirring was continued for a few minutes to allow completion of the reaction and then filtered. The filtered precipitate thus obtained was washed with 100 grams of hot water and then slurried with 200 grams of hot water to wash out the lithium values and the slurry again filtered. The filtrate from the first filtration was combined with the washings and last filtrate. The resulting solution was evaporated to about 400 c. c. in volume and the concentrated solution so obtained was treated by adding to it about 0.7 gram of a 56 per cent aqueous solution of ferric bromide hexahydrate to precipitate any remaining soluble phosphate. To the mixture thus obtained was added 1.08 grams of sodium hydroxide to raise the pH to about 8, thereby precipitating ferric hydroxide and phosphate as a suspension. At the same time about 0.5 gram of active charcoal (Norit) was stirred into the suspension. The resulting mixture was filtered, leaving a clear, odorless filtrate. To this filtrate was added about 0.5 gram of sodium sulphide crystals ($NaS.9H_2O$) so as to precipitate the heavy metals as sulphides. The resulting mixture was allowed to stand for a time and then filtered to remove the precipitated sulphides. After filtering off the precipitated sulphides, about 1.3 grams of 48 per cent hydrobromic acid was added, and the resulting mixture was then boiled to expel the hydrogen sulphide thereby formed. The sulphate present was precipitated by adding, with stirring, about 0.5 gram of barium chloride ($BaCl_2.2H_2O$) dissolved in water. The mixture was then filtered and the filtrate made slightly alkaline with caustic soda. The resulting solution was evaporated to a density (at 80° F.) of about 1.72 grams per c. c., the point at which substantially all the sodium bromide crystallizes out on cooling to room temperature. The sodium bromide crystals obtained upon cooling the solution were separated from the mother liquor. The sodium bromide thus obtained weighed 31.4 grams. Analysis of the mother liquor showed that it contained 58.4 grams of LiBr.

Example 2

A 50-gram quantity of the lithium-sodium phosphate concentrate was formed into a slurry with water in similar manner to that of Example 1 and heated to near the boiling point. The heated slurry was slowly added while stirring to a hot aqueous solution of aluminum chloride composed of 47.7 grams of $AlCl_3$ dissolved in 340 c. c. of water. The resulting reaction produced a precipitate of aluminum phosphate and alkali metal chlorides dissolved in the solution. The precipitate was filtered from the solution and washed with about 400 c. c. of water. The washings were combined with the filtrate and evaporated to a volume of about 400 c. c. The pH of the solution so obtained was raised to 8 by the addition of 0.66 gram of NaOH, and 0.5 gram of active charcoal (Norit) was also added with stirring. The resulting charcoal-treated solution was filtered and the filtrate treated with 0.5 gram of $Na_2S.9H_2O$ dissolved in water to precipitate heavy metals present as sulphides. After filtering off the precipitated sulphides, 1.3 grams of 48 per cent HBr solution was added, followed by boiling to expel the liberated $H_2S$. Sulphates were then precipitated by adding 0.5 gram of $BaCl_2.2H_2O$ dissolved in water. The resulting mixture was filtered and the filtrate evaporated by boiling to a density of 1.18 grams per c. c. (at 80° F.). After cooling the solution thereby concentrated, 16.4 grams of sodium chloride crystals were separated from the solution. Analysis of the solution showed that it contained 24.8 grams of LiCl.

I claim:

1. The method of treating lithium-sodium phosphate so as to prepare therefrom a halide selected from the group consisting of the bromide and chloride of lithium which comprises reacting a hot aqueous slurry of the finely divided phosphate with a hot aqueous solution of the corresponding halide of one of the trivalent metals aluminum and iron, whereby to precipitate the phosphate in combination with the trivalent metal and form the corresponding halide of lithium.

2. The method of treating lithium-sodium phosphate so as to prepare therefrom the bromide of lithium which comprises reacting a hot aqueous slurry of the finely divided phosphate with a hot aqueous solution of the bromide of one of the trivalent metals aluminum and iron, whereby to precipitate the phosphate in combination with the trivalent metal and form lithium bromide.

3. The method of treating lithium-sodium phosphate so as to prepare therefrom the bromide of lithium which comprises reacting a hot aqueous slurry of the finely divided phosphate with a hot aqueous solution of ferric bromide whereby to precipitate the phosphate as ferric phosphate and form lithium bromide.

4. The method of treating lithium-sodium phosphate so as to prepare therefrom the bromide of lithium which comprises reacting a hot aqueous slurry of the finely divided phosphate with a hot aqueous solution of aluminum bromide whereby to precipitate the phosphate as aluminum phosphate and form lithium bromide.

5. The method of treating lithium-sodium phosphate so as to prepare therefrom the chloride of lithium which comprises reacting a hot aqueous slurry of the finely divided phosphate with a hot aqueous solution of aluminum chloride whereby to precipitate the phosphate as aluminum phosphate and form lithium chloride.

6. The method of treating lithium-sodium phosphate so as to prepare therefrom the chloride of lithium which comprises reacting a hot aqueous slurry of the finely divided phosphate with a hot aqueous solution of ferric chloride whereby to precipitate the phosphate as ferric phosphate and form lithium chloride.

7. The method of treating lithium-sodium phosphate so as to prepare therefrom the bromide of lithium in solution which comprises reacting a hot aqueous slurry of the finely divided phosphate with a hot aqueous solution of ferric bromide whereby to precipitate the phosphate as ferric phosphate and form lithium bromide and sodium bromide in solution, and separating the sodium bromide from the solution.

8. The method of treating lithium-sodium phosphate so as to prepare therefrom the bromide of lithium in solution which comprises reacting a hot aqueous slurry of the finely divided phosphate with a hot aqueous solution of aluminum bromide whereby to precipitate the phosphate as aluminum phosphate and form lithium bromide and sodium bromide in solution, and separating the sodium bromide from the solution.

9. The method of treating lithium-sodium phosphate so as to prepare therefrom the chloride of lithium in solution which comprises reacting a hot aqueous slurry of the finely divided phosphate with a hot aqueous solution of ferric chloride whereby to precipitate the phosphate as ferric phosphate and form lithium chloride and sodium chloride in solution, and separating the sodium chloride from the solution.

10. The method of treating lithium-sodium phosphate so as to prepare therefrom the chloride of lithium in solution which comprises reacting a hot aqueous slurry of the finely divided phosphate with a hot aqueous solution of aluminum chloride whereby to precipitate the phosphate as aluminum phosphate and form lithium chloride and sodium chloride in solution, and separating the sodium chloride from the solution.

VERNON A. STENGER.

REFERENCES CITED

The following references are of record in the file of this patent:

UNITED STATES PATENTS

| Number | Name | Date |
| --- | --- | --- |
| 2,414,974 | Nielsen | Jan. 28, 1947 |

OTHER REFERENCES

"Production of Lithium Chloride from Spodumene by a Lime-Gypsum Roast Process," by Sternberg, Hayes and Williams, R. 1. 3848, March 1946, page 7. (Article published by the U. S. Bureau of Mines.)